United States Patent [19]

Tan et al.

[11] Patent Number: 4,562,326
[45] Date of Patent: Dec. 31, 1985

[54] MACHINE FOR WELDING AUTOMOTIVE WHEEL RIM BLANKS

[75] Inventors: Archie Tan, Wilmette; Vernon R. Fencl, Northbrook, both of Ill.

[73] Assignee: Grotnes Metalforming Systems, Inc., Chicago, Ill.

[21] Appl. No.: 593,806

[22] Filed: Mar. 27, 1984

[51] Int. Cl.[4] ............................................. B23K 11/02
[52] U.S. Cl. ................................ 219/59.1; 219/61.1; 219/61.13
[58] Field of Search ............... 219/59.1, 61.1, 61.13, 219/61.2, 61.3, 61.4, 61.5, 66, 67, 101, 102, 104, 161

[56] References Cited

U.S. PATENT DOCUMENTS

| | | | |
|---|---|---|---|
| 924,868 | 6/1909 | Winfield et al. | 219/101 |
| 1,727,166 | 9/1929 | Frick | 219/102 |
| 2,713,626 | 7/1955 | Lewis | 219/101 |
| 3,573,416 | 4/1971 | Drechsler | 219/110 X |
| 3,937,914 | 2/1976 | Larson et al. | 219/61.13 |
| 4,187,406 | 2/1980 | Fencl et al. | 219/59.1 |
| 4,442,337 | 4/1984 | Nakata et al. | 219/117.1 |

*Primary Examiner*—C. L. Albritton
*Assistant Examiner*—Catherine M. Sigda
*Attorney, Agent, or Firm*—Marshall, O'Toole, Gerstein, Murray & Bicknell

[57] ABSTRACT

The longitudinal edge portions of a cylindrical wheel rim blank are gripped by a pair of laterally spaced clamping assemblies each having a radially fixed inside clamping member and each having a radially movable outside clamping member adapted to clamp the blank against the inside member. After the rim blank has been clamped, the two clamping members of one of the clamping assemblies are pivoted laterally toward the clamping members of the other assembly to press the edges of the rim blank against one another preparatory to welding current being directed through the blank to weld the edges. A load cell detects the force applied to the pivoted clamping assembly and produces a signal which is used to monitor or control the force.

17 Claims, 11 Drawing Figures

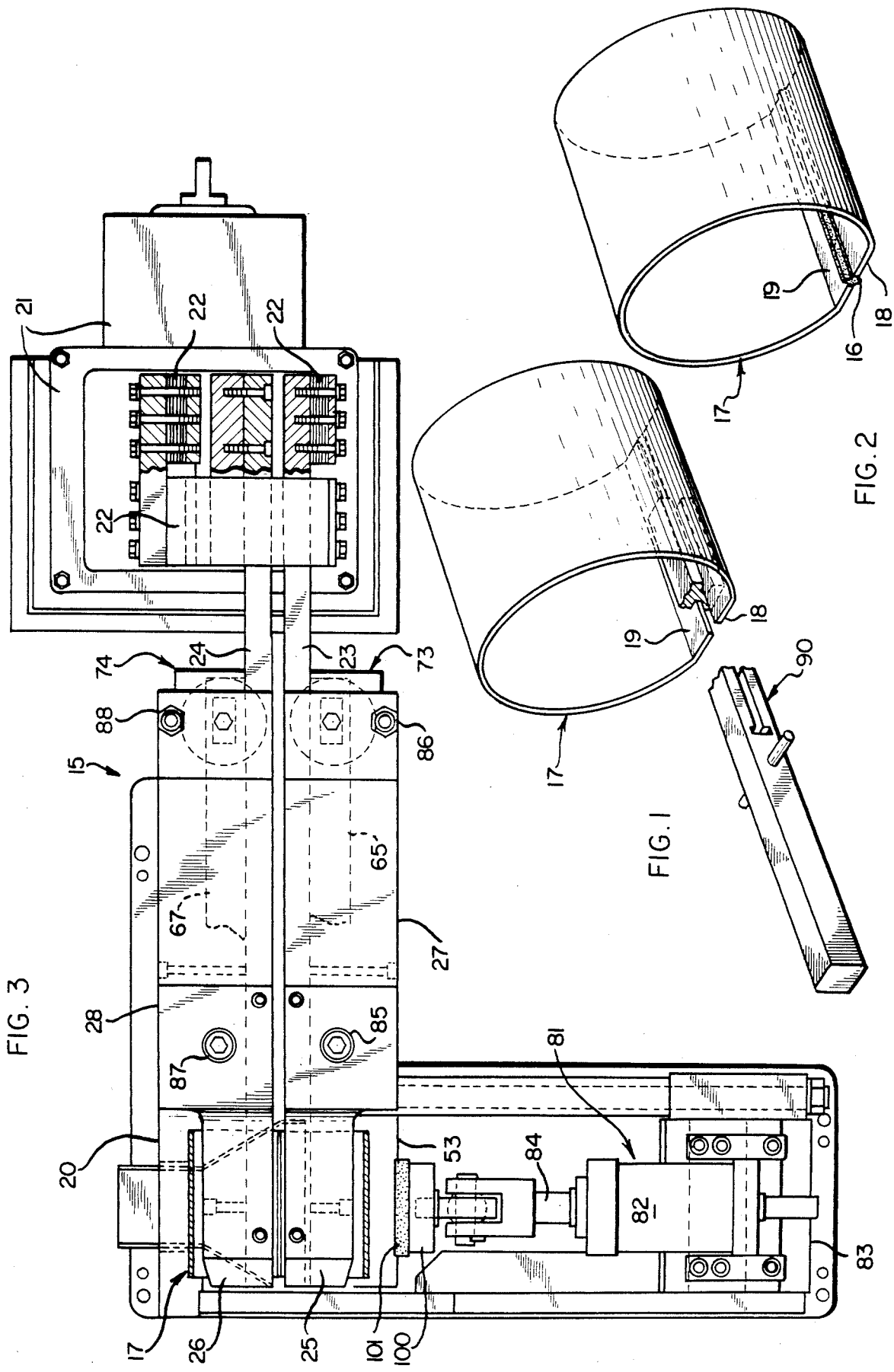

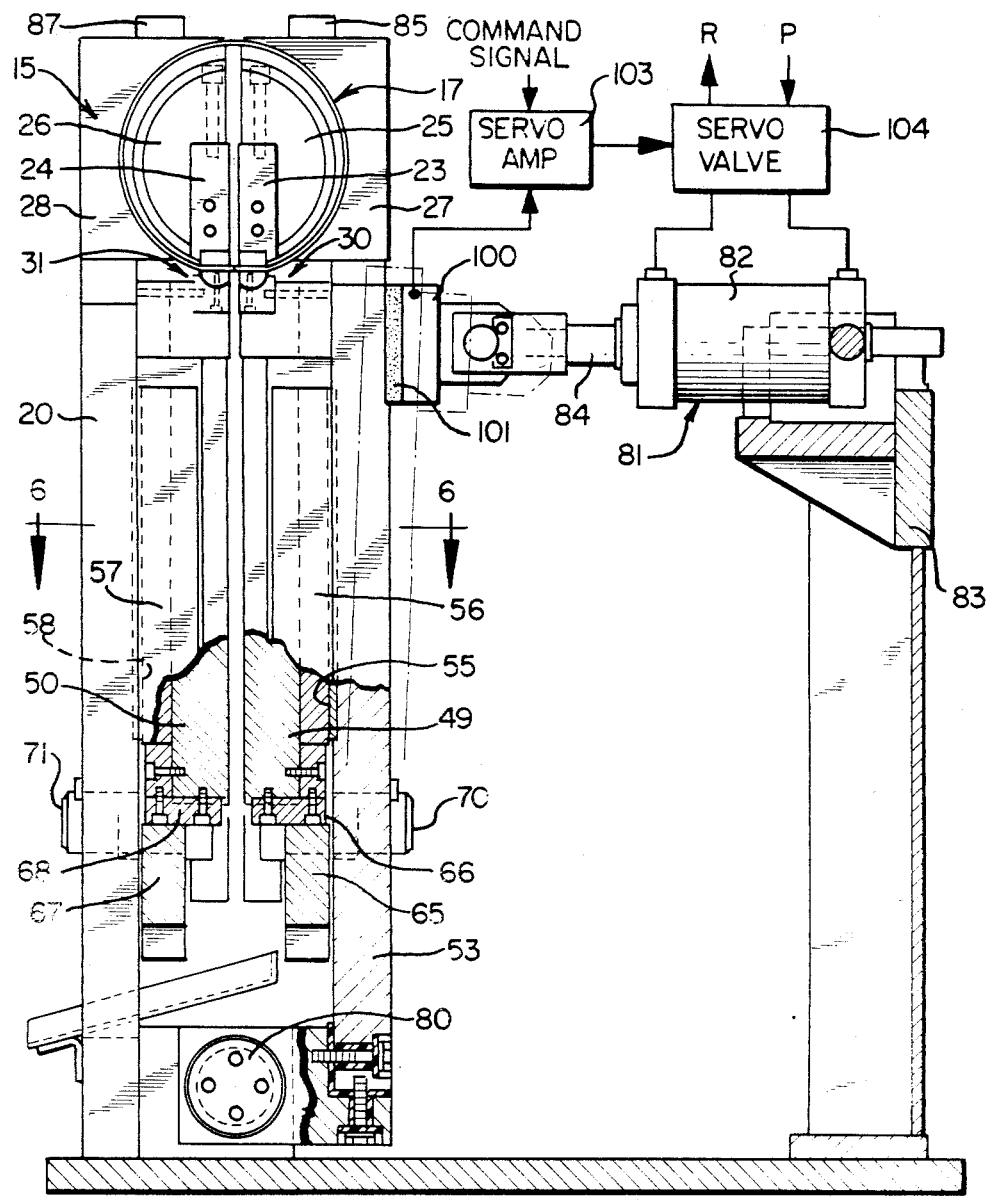
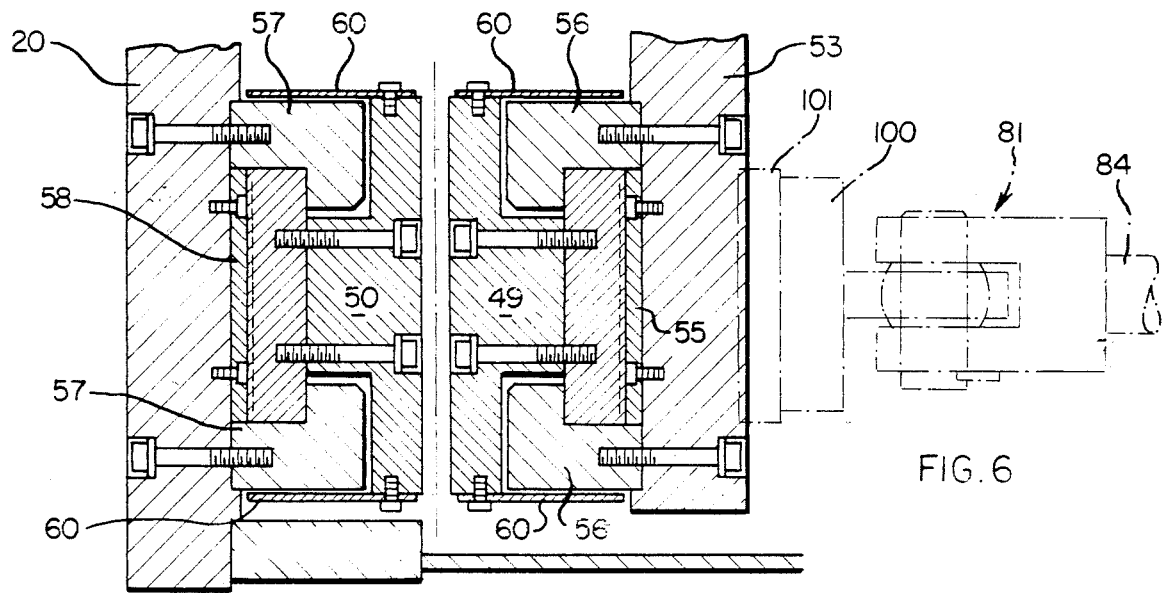
FIG. 5
FIG. 6

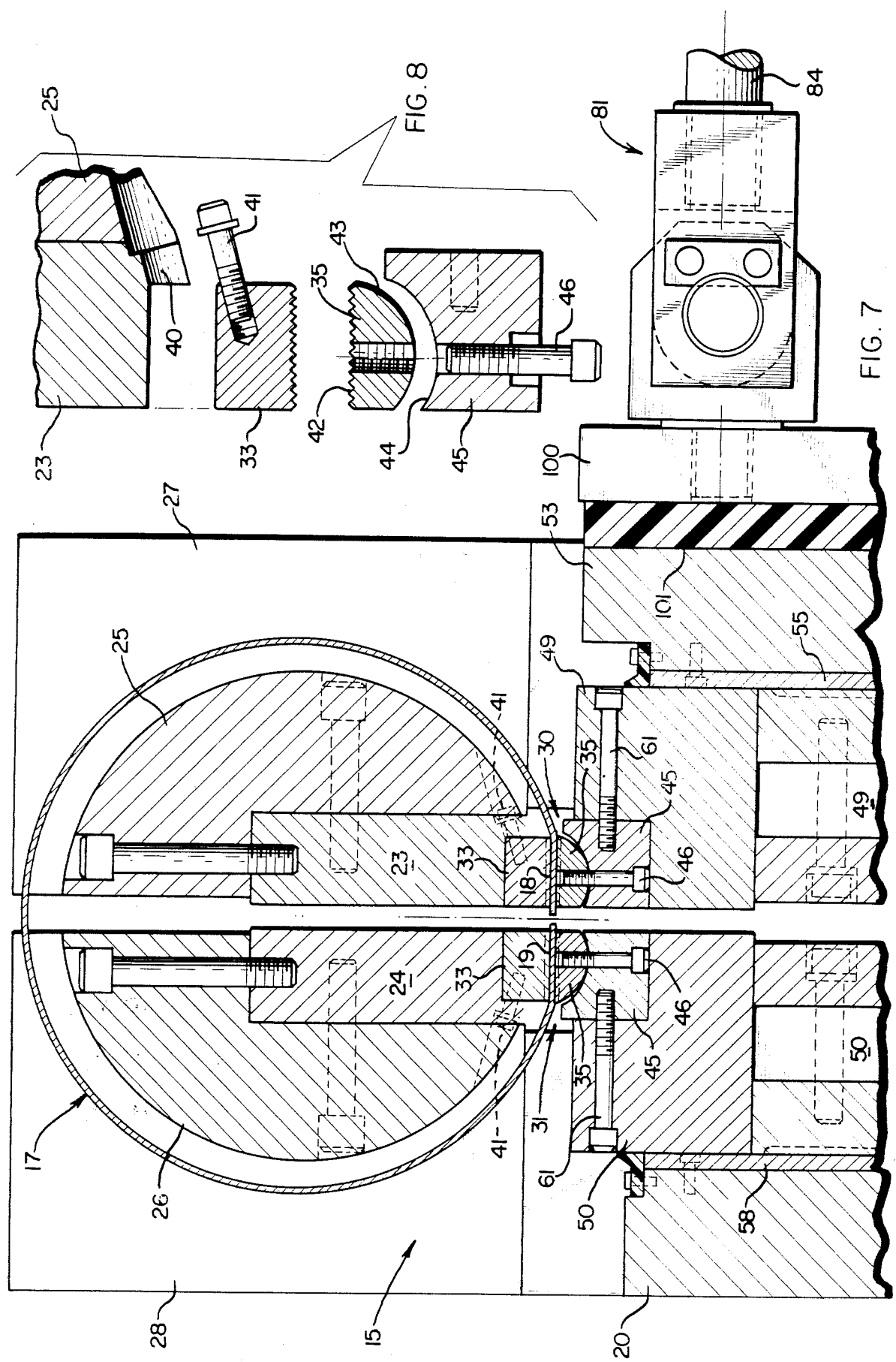

MACHINE FOR WELDING AUTOMOTIVE WHEEL RIM BLANKS

BACKGROUND OF THE INVENTION

This invention relates to a butt welding machine for welding the longitudinal seam of an automotive wheel rim blank formed from a strip of metal which has been rolled into a cylinder. Typically, the rim blank is clamped between the inside and outside jaws of a pair of laterally spaced clamping assemblies located on opposite sides of a weld zone which extends along the longitudinal seam. When the blank is first clamped, its longitudinal edges are spaced laterally from each other. The clamped edges then are pressed laterally together and, while lateral pressure is being applied to the edges, an electric welding current is passed through the clamping assemblies and the rim blank to weld the edges to one another.

A welding machine of this general type is disclosed in Fencl et al U.S. Pat. No. 4,187,406. In addition to the clamping assemblies, that machine requires a separate set of swingable jaws which embrace and push against the outside of the rim blank to press the longitudinal edges together. The machine is somewhat complex and requires rather precise correlation between the clamping assemblies and the swingable jaws.

Another welding machine is disclosed in Lewis U.S. Pat. No. 2,713,626. In that machine, the edges of the rim blank are pressed together simply by rocking one clamping assembly lateral toward the other clamping assembly while the edges of the blank are clamped by the two assemblies. The inside clamping jaws of the assemblies, however, are required to pivot between open and closed positions relative to the outside jaws. Such pivoting adds to the complexity of the machine and makes it difficult to establish parallelism between the inside and outside jaws and particularly if the thickness of the rim blank varies from blank-to-blank or between various batches or blanks.

SUMMARY OF THE INVENTION

The general aim of the present invention is to provide a comparatively simple and relatively rugged welding machine of the foregoing general type in which the clamping assemblies are uniquely arranged to effect both secure clamping and positive forcing together of the longitudinal edges of the rim blank while being capable of handling rim blanks of various thicknesses without need of being adjusted to accommodate the different thicknesses.

A more detailed object of the invention is to achieve the foregoing by providing a welding machine in which one of the clamping assemblies is adapted to be swung toward the other assembly to press the edges of the rim blank together but in which the inside and outside jaws of the clamping assemblies are arranged such that the inside jaws are fixed radially of the blank while the outside jaws are movable radially of the blank to effect opening and closing of the jaws. In this way, a positive pressing motion is applied to one of the clamping assemblies and yet the jaws of each assembly always remain parallel to one another to avoid the need for making adjustments to the jaws to compensate for blanks of different thicknesses.

Another object of the invention is to detect the lateral force applied to the swingable clamping assembly and to utilize the signal resulting from the detection to adjust the applied force to a desired magnitude.

The invention also resides in the novel mounting of the inside jaws on rugged and durable vertically movable slides, one of which is also swingable in order to press the edges of the blank together. In addition, the invention is characterized by the unique manner in which the inside and outside jaws are supported by and are connected to holders for the jaws.

These and other objects and advantages of the invention will become more apparent from the following detailed description when taken in conjunction with the accompanying drawings.

BRIEF DESCRIPTION OF THE DRAWINGS

FIG. 1 is a perspective view showing a typical rim blank prior to the blank being welded and also showing a fixturing tool for loading the blank into the welding machine.

FIG. 2 is a perspective view showing the rim blank after the latter has been welded.

FIG. 3 is a top plan view of a new and improved rim blank welding machine incorporating the unique features of the present invention.

FIG. 5 is a front elevational view of the machine with certain parts being broken away and shown in section.

FIG. 6 is an enlarged fragmentary cross-section taken substantially along the line 6—6 of FIG. 5.

FIG. 7 is an enlarged fragmentary cross-section taken substantially along the line 7—7 of FIG. 4.

FIG. 8 is an exploded cross-sectional view showing the inside and outside jaws of one of the clamping assemblies.

DETAILED DESCRIPTION OF THE PREFERRED EMBODIMENT

Figure 4:
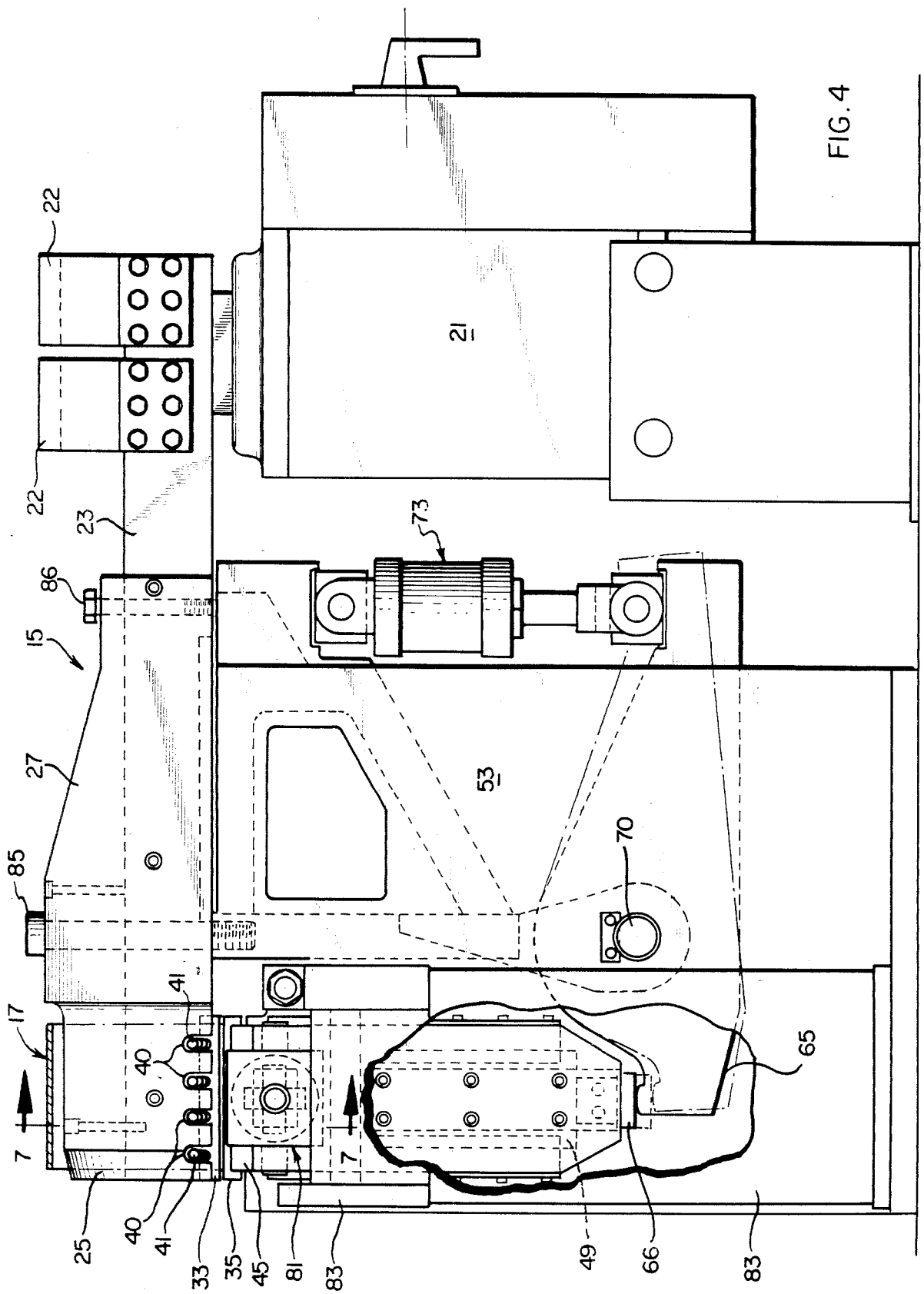
FIG. 4 is a side elevational view of the welding machine shown in FIG. 3 certain parts of the machine being broken away and shown in section.

As shown in the drawings for purposes of illustration, the invention is embodied in a machine 15 for forming the longitudinal weld seam 16 (FIGS. 2 and 11) of an automotive wheel rim blank 17 formed by a strip of metal which has been rolled into a substantially cylindrical shape by a coiling operation. A typical rim blank as it exists after being rolled but before being welded is illustrated in FIG. 1. As shown, the two longitudinal edge portions 18 and 19 of the blank are spaced laterally from one another and are flattened inwardly from the outline of the cylinder so that the edge portions are coplanar. Welding of the rim blank is effected by clamping the two edge portions 18 and 19 in their coplanar relationship (FIG. 10) and by pressing the edge portions together (FIG. 11) while directing an electric welding current through the blank. The combined heat and pressure softens and upsets the metal so that a seam in the form of a butt weld 16 (FIG. 11) is formed at the junction of the edge portions when the metal cools and fuses.

The machine 15 comprises a fabricated main base and frame which has been indicated in its entirety by the reference numeral 20. At the rear of the frame is a welding transformer 21 for producing either a.c. or pulsating d.c. welding current. Such current is carried by a pair of flexible arcuate conductors 22 (FIG. 4) connected to a pair of elongated and laterally spaced bus bars 23 and 24. The latter are fixed to the inboard faces of a pair of laterally spaced and semi-circular horn members 25 and 26 which together form a generally circular horn over which the rim blank 17 is placed at the start of the welding operation. The semi-circular horn members are located at the forward ends of rather massive rectangular mounting bars 27 and 28.

Figure 9:
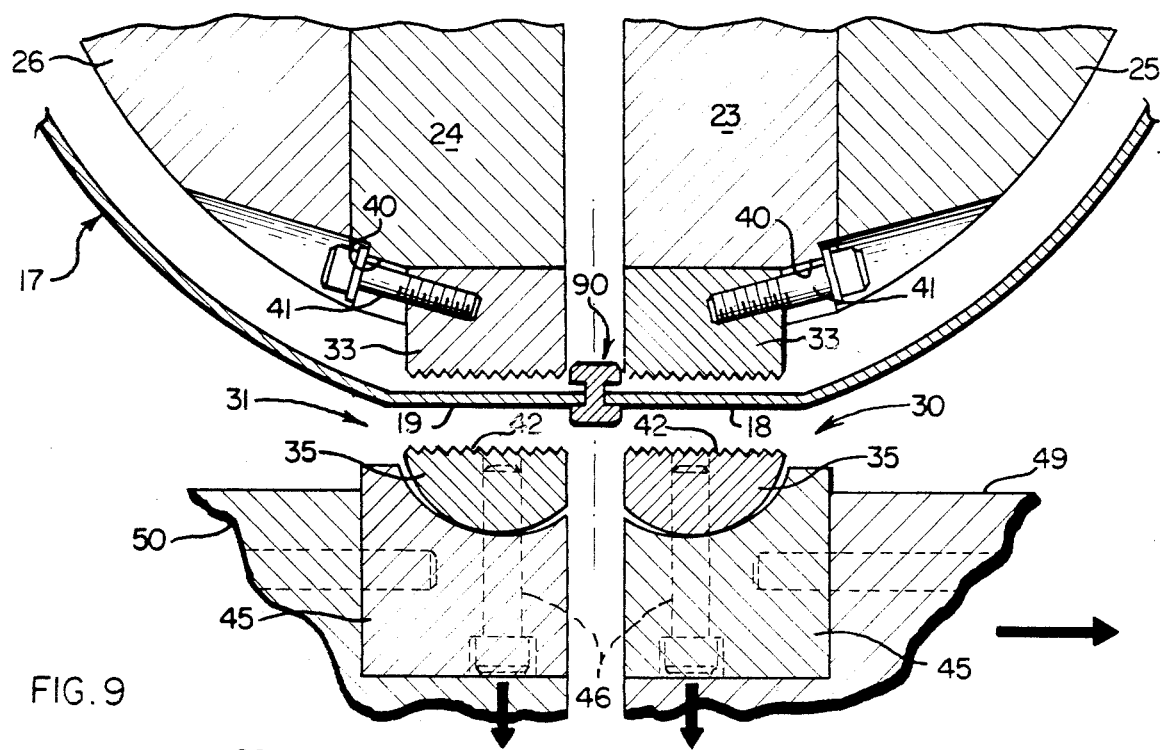
FIGS. 9 and 11 are enlarged fragmentary cross-sectional views similar to FIG. 7 and showing the successive positions of the jaws of the clamping assemblies during welding of the rim blank.

As shown in FIGS. 7 and 9, the machine 15 includes a pair of laterally spaced clamping assemblies 30 and 31 each having an inside clamping member 33 and an outside clamping member 35 (FIGS. 7 to 11). In accordance with the present invention, the inside clamping members 33 of each clamping assembly 30, 31 are fixed radially of the rim blank 17, the outside clamping members 35 are movable linearly relative to the inside members to clamp the edges 18 and 19 of the blank, and the clamping assembly 30 is adapted to be positively pivoted toward the assembly 31 to press the clamped edge 18 against the clamped edge 19 preparatory to and during the welding operation. As a result of this arrangement of the clamping assemblies 30 and 31 and the inside and outside clamping members 33 and 35 thereof, the machine 15 is relatively simple in construction, is rugged and durable in operation and is capable of handling rim blanks of various thicknesses without need of adjustment.

More specifically, the inside clamping member 33 of each clamping assembly 30, 31 is in the form of an elongated metal jaw or electrode having a lower serrated face for clamping the rim blank 17. The electrode 33 of the clamping assembly 30 is secured to the lower side of the bus bar 23 while the electrode 33 of the clamping assembly 31 is secured to the lower side of the bus bar 24 (see FIG. 9). Advantageously, the electrodes 33 are secured to the bus bars in a manner permitting the electrodes to be quickly and easily attached to and detached from the bus bars. For this purpose, several notches 40 (FIGS. 4 and 8) are formed along each bus bar and open out of the lower side thereof. Screws 41 are located in the notches and are threaded into holes in the associated electrode. When the screws 41 are tightened, their heads clamp against the bus bar adjacent the notches 40 and thereby lock the electrode to the bus bar. When loosened, the screws 41 release the bus bar and may be slipped downwardly from the lower ends of the notches 40. This enables quick and easy replacement of the electrodes. The horn members 25 and 26 also are notched to accommodate the screws.

The outside clamping member 35 of each clamping assembly 30, 31 is an elongated jaw having a serrated upper clamping face 42 and having a convex lower face 43 (see FIG. 8). The convex face of each jaw engages a concave pocket 44 formed in the upper side of an underlying jaw holder 45, the radius of the convex face 43 being somewhat less than the radius of the concave pocket 44. A screw 46 extends through the jaw holder 45 and is threaded into the jaw 35 to secure the two together. When the jaw clamps the edge 18, 19 of the rim blank 17, the convex face 43 of the jaw is capable of rocking through a very slight angle within the concave pocket 44 of the holder to enable the jaw to move into parallelism with the edge of the blank. During such clamping, the screw 46 flexes laterally to permit limited rocking of the jaw.

In keeping with the invention, the outside jaws 35 of the two clamping assemblies 30 and 31 are adapted to move vertically between open and closed positions relative to the fixed inside electrodes 33 and, in addition, the electrode 33 and the jaw 35 of the clamping assembly 30 are adapted to be pivoted laterally relative to the electrode 33 and the jaw 35 of the clamping assembly 31. To this end, the jaw 35 of the clamping assembly 31 is carried on a slide 50 whcih is adapted to be moved vertically on the frame 20. The jaw 35 of the clamping assembly 30 also is carried on a vertically movable slide 49 but that slide is mounted on a saddle 53 which, in turn, is mounted to pivot laterally on the frame 20.

As shown in FIG. 6, each of the slides 49 and 50 is generally H-shaped in cross-section. The slide 49 engages a wear plate 55 on the saddle 53 and is guided for up and down movement by a pair of gibs 56 secured to the saddle. A similar pair of gibs 57 is secured to the frame 20 and guides the slide 50 for up and down movement along a wear plate 58 on the frame. Grease grooves are machined into the sliding surfaces to distribute lubricant from lubrication points which communicate with an automatic central lubrication system (not shown). Shields 60 (FIG. 6) are carried on the front and rear sides of the slides to reduce fouling of the sliding surfaces by dust or the like.

The jaws 35 of the clamping assemblies 30 and 31 are carried on the upper ends of the slides 49 and 50, respectively, with the jaw holders 45 being fastened to the slides by screws 61 (FIG. 7). To move the jaws vertically between their open and closed positions, a lever 65 (FIG. 4) underlies a pad 66 on the lower end of the slide 49 while a similar lever 67 (FIG. 5) underlies a pad 68 on the lower end of the slide 50. Horizontal pivot pins 70 and 71 support the levers 65 and 67, respectively, for up and down rocking, the pin 70 being mounted on the saddle 53 and the pin 71 being mounted on the frame 20. The lever 65 is adapted to be rocked by a reciprocating actuator 73 (FIG. 4) in the form of a hydraulic cylinder which is connected between the saddle and the lever. Another hydraulic cylinder 74 (FIG. 3) is connected between the lever 67 and the frame 20 to effect rocking of the latter lever. When the levers are rocked clockwise by the cylinders, the free ends of the levers engage the pads 66 and 68 to raise the slides 49 and 50 and move the jaws 35 to their closed positions, the force applied by the cylinders being amplified by the levers in about a two-to-one ratio. Counterclockwise rocking of the levers enables the slides to move downwardly under their own weight to effect opening of the jaws.

To mount the saddle 53 for lateral pivoting on the frame 20, a large horizontal pivot shaft 80 (FIG. 5) is located at the lower end of the saddle and is connected to the frame. Lateral pivoting of the saddle is effected by a hydraulic actuator 81 having a cylinder 82 connected to a post 83 on the frame 20 and having a rod 84 connected to the saddle and adapted to swing the saddle about the pivot shaft 80. The pivot shaft extends parallel to the axis of the rim blank 17 and thus the slide 49 and the jaw 35 of the clamping assembly 30 move toward and away from the slide 50 and the jaw 35 of the clamping assembly 31 when the rod 84 is extended and retracted.

Further in carrying out the invention, the outer clamping member or electrode 33 of the clamping assembly 30 is adapted to pivot back and forth with the saddle 53 and the jaw 35 of the clamping assembly 30. For this purpose, the mounting bar 27 which supports the horn member 25, the bus bar 23 and the associated electrode 33 is secured to the upper end of the saddle 53 by a large screw 85 (FIG. 4) located adjacent the forward end portion of the mounting bar 27 and threaded into the saddle. Another screw 86 is threaded into the rear portion of the mounting bar 27 and bears against the upper end of the saddle. By adjusting the screw 86, the mounting bar 27 may be rocked slightly to establish parallelism between the associated electrode 33 and the underlying jaw 35, the screw 84 bending slightly during such rocking. Similar screws 87 and 88 (FIG. 3) secure the other mounting bar 28 to the upper end of the frame 20.

At the beginning of a welding cycle, the clamping assembly 30 is spaced laterally from the clamping assembly 31 and is positioned as shown in FIG. 9. In addition, the jaws 35 of the two clamping assemblies are in their open positions and are spaced downwardly from the electrodes 33 as also shown in FIG. 9. With the parts thus positioned, a rim blank 17 is loaded into the machine 15.

To facilitate loading and accurate location of the rim blank 17, use is made of an elongated loading/fixturing tool 90 of the type shown in FIGS. 1 and 9. Such a tool includes a slotted end portion adapted to slip between the two edges 18 and 19 of the blank 17 and adapted to maintain the edges in an accurately established laterally spaced relationship.

To tool 90 is used to lift the rim blank 17 and to place the blank on the horn members 25 and 26 such that the blank hangs from the horn members. When the blank is so positioned, the tool is disposed between the electrodes 33 as shown in FIG. 9 and locates the edges of the blank in a centered position between the electrodes.

Figure 10:
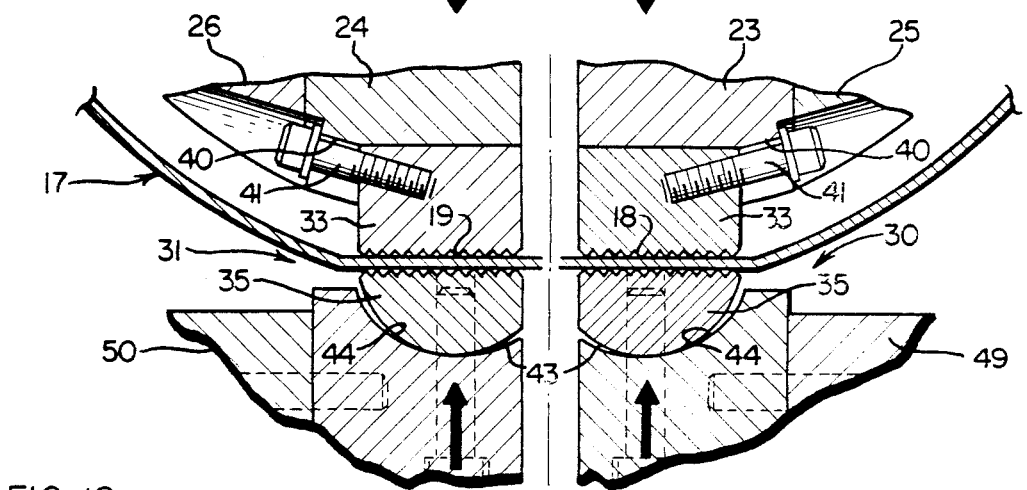
Figure 11:
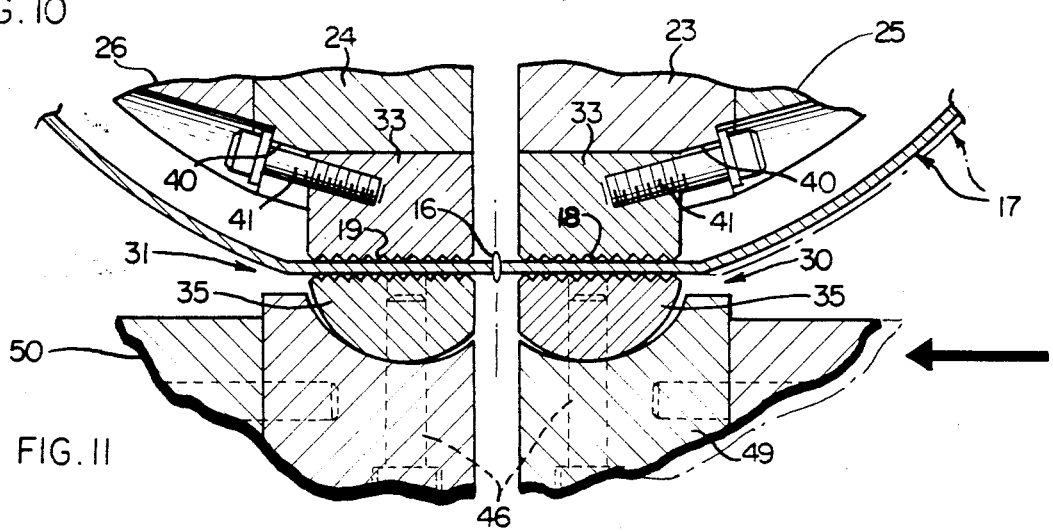

A cycle is initiated by actuating the cylinders 73 and 74 to raise the slides 49 and 50 and move the jaws 35 upwardly to their closed positions. As a result, the jaws 35 move the blank 17 upwardly and clamp the edges 18 and 19 thereof tightly to the electrodes 33 as shown in FIG. 10. After the tool 90 has been removed, the rod 84 of the actuator 81 is extended to swing the saddle 53 counterclockwise about the pivot shaft 80. As an incident thereto, the electrode 33 and the jaw 35 of the clamping assembly 30 move toward the electrode 33 and the jaw 35 of the clamping assembly 31 and press the edge 18 against the edge 19 (see FIG. 11). Welding current from the transformer 21 then passes through the electrodes, the rim blank and the jaws in a conventional manner to heat and soften the edges of the blank. During application of the welding current, the saddle 53 is pivoted further in a counterclockwise direction to cause the electrode 33 and the jaw 35 of the clamping assembly 30 to press the edge 18 into the edge 19. As a result, the metal at the edge portions is upset and ultimately forms the butt weld 16 when the current is removed to allow the metal to cool and fuse.

Thus, the present invention brings to the art a new and improved rim welding machine 15 in which the clamping members 33, 35 of the clamping assembly 30 are positively swung toward the clamping members 33, 35 of the clamping assembly 31 to force the edge 18 against the edge 19. As a result, the need for complex additional mechanism acting on the blank 17 for pressing the edges together is avoided. Since the clamping members 33 and 35 close by moving the clamping members 35 linearly, a parallel relationship is always maintained between the clamping members so that rim blanks of different thicknesses can be handled without adjusting the relative positioning of the clamping members.

According to another aspect of the invention, the force applied to the saddle 53 by the actuator 81 is detected, a signal which varies as a function of the force is produced, and the signal is used to enable the force to be monitored and/or automatically adjusted. In the present instance, this is achieved through the use of a so-called load cell 100 (FIG. 5) which is suitably connected between the saddle 53 and the rod 84 of the actuator 81, there being an insulating wafer 101 sandwiched between the load cell and the saddle. The load cell itself is of conventional construction and acts to produce an electrical signal which varies as a function of the force applied by the actuator.

The signal produced by the load cell 100 may be routed to a suitable read-out device (not shown) which may be monitored visually to enable appropriate adjustment of a valve system (not shown) for controlling the actuator 81. Alternatively, the load cell signal may be routed as a feedback signal to a servo amplifier 103 (FIG. 5) adapted to receive a command signal representative of the force desired to be applied by the actuator at any given time. The command signal and the feedback signal are algebraically summed and the resulting error signal is used to drive a servo valve 104 for controlling the actuator. When an error signal is produced, the valve causes the actuator to shift until the feedback signal agrees with the command signal so that the actual force applied by the actuator is equal to the desired or commanded force.

We claim:

1. A welding machine for welding the longitudinal seam of a wheel rim blank which has been rolled into a cylinder, the longitudinal edges of the blank forming the weld zone for the longitudinal seam, said machine having first and second clamping assemblies on laterally opposite sides of said weld zone and each including an inside clamping member and an outside clamping member for engaging the inner and outer surfaces, respectively, of the rim blank adjacent said weld zone, the inside member of each clamping assembly being substantially fixed against movement radially of the rim blank, a pair of mounting means each mounting the outside member of a respective clamping assembly for linear movement of that outside member independently of the other outside member and radially of the rim blank between open and closed positions with respect to the inside member of the clamping assembly, means supporting the clamping members of said first clamping assembly for lateral pivoting toward and away from the clamping members of said second clamping assembly, a pair of moving means each for linearly moving the outside member of a respective clamping assembly independently of the other to said closed position after a rim blank has been placed between the inside and outside members, means for thereafter pivoting the means supporting the clamping members of said first assembly laterally toward the clamping members of said second assembly to press the longitudinal edges of the rim blank against one another, and means for passing an electric welding current through said clamping assemblies and the longitudinal edges of the rim blank to effect welding of the longitudinal edges.

2. A welding machine as defined in claim 1 in which each of said mounting means includes a vertically movable slide supporting the outside clamping member of said respective clamping assembly, and in which each of said moving means comprises means for shifting a respective slide linearly upwardly to move said outide clamping member to said closed position and for shifting said respective slide linearly downwardly to move said outside clamping member to said open position.

3. A welding machine as defined in claim 2 in which said moving means comprise first and second reciprocating actuators, and first and second force-amplifying levers connecting said first and second actuators to said first and second slides, respectively.

4. A welding machine as defined in claim 2 in which said supporting means include a saddle mounting said first slide for back and forth rocking about a pivot axis extending parallel to the axis of the rim blank.

5. A welding machine as defined in claim 4 in which the inside clamping member of said first clamping assembly is supported by said saddle to rock back and forth with said saddle about said pivot axis.

6. A welding machine as defined in claim 1 in which each of said outside clamping members comprises a jaw having a substantially planar clamping surface and having a convex mounting surface disposed on the opposite side of said jaw from said clamping surface, a jaw holder for each of said jaws and having a concave seat engageable with the convex mounting surface of the jaw, the radius of the convex mounting surface of said jaw being slightly less than the radius of the concave seat of said holder thereby to permit said jaw to rock on said holder, and means for securing each jaw to its respective holder while permitting limited rocking of the jaw on the holder.

7. A welding machine as defined in claim 1 in which each of said inside clamping members comprises an elongated welding electrode, an elongated bus bar for conducting electrical current to each electrode, notches spaced along each of said bus bars, and screws disposed within the notches of each bus bar and threaded into the respective electrode, said screws being clamped to the bus bar adjacent said notches and being removable from said notches upon being unclamped from said bus bar.

8. A welding machine as defined in claim 4 in which said pivoting means comprise a reciprocating actuator connected to said saddle and operable to rock said saddle back and forth about said pivot axis.

9. A welding machine as defined in claim 8 further including means for detecting the force applied by said actuator to said saddle and for producing an electrical signal which varies as a function of such force.

10. A welding machine as defined in claim 9 in which said detecting means comprise a load cell connected between said actuator and said saddle.

11. A welding machine as defined in claim 9 in which said signal is used as a feedback signal in a closed loop servo system having means for producing a command signal representative of the force desired to be applied to said saddle by said actuator, having means for comparing the command signal with the feedback signal, and having means for producing an error signal which changes as a function of the difference between the command signl and the feedback signal and which, upon changing, causes the force applied by said actuator to vary.

12. A welding machine for welding the longitudinal seam of a wheel rim blank which has been rolled into a cylinder, the longitudinal edges of the blank forming the weld zone for the longitudinal seam, said machine having first and second clamping assemblies on laterally opposite sides of said weld zone and each including an inside clamping member and an outide clamping member for engaging the inner and outer surfaces, respectively, of the rim blank adjacent said weld zone, a pair of mounting means each mounting the outside member of a respective clamping assembly for linear movement radially of the rim blank between open and closed positions with respect to the inside member of the clamping assembly, means supporting the clamping members of said first clamping assembly for lateral movement toward and away from the clamping members of said second clamping assembly, a pair of moving means each for linearly moving the outside member of a respective clamping assembly to said closed position after a rim blank has been placed between the inside and outside members, actuator means for thereafter applying a lateral force to said first clamping assembly to move the clamping members of said first assembly laterally toward the clamping members of said second assembly and thereby press the longitudinal edges of the rim blank against one another, means for detecting the force applied by said actuator means to said first clamping assembly and for producing a signal which varies as a function of such force, and means for passing an electrical welding current through said welding assemblies and the longitudinal edges of the rim blank to effect welding of the longitudinal edges.

13. A welding machine as defined in claim 12 in which said detecting means comprise a load cell connected between said actuator means and said first clamping assembly.

14. A welding machine as defined in claim 12 in which said signal is used as a feedback signal in a closed loop servo system having means for producing a command signal representative of the force desired to be applied to said first clamping assembly by said actuator means, having means for comparing the command signal with the feedback signal, and having means for producing an error signal which changes as a function of the difference between the command signal and the feedback signal and which, upon changing, causes the force applied by said actuator means to vary.

15. A welding machine as defined in claim 12 in which said mounting means include first and second vertically movable slides supporting the outside clamping members of said first and second clamping assemblies, respectively, said supporting means comprising a saddle mounting said first slide for back and forth rocking about a pivot axis extending parallel to the axis of the rim blank, and said actuator means comprising a reciprocating actuator connected to said saddle and operable to rock said saddle back and forth about said pivot axis.

16. A welding machine for welding the longitudinal seam of a wheel rim blank which has been rolled into a cylinder, the longitudinal edges of the blank forming the weld zone for the longitudinal seam, said machine comprising:

first and second clamping assemblies on laterally opposite ides of said weld zone and each including an inside clamping member and an outside clamping member for engaging the inner and outer surfaces, respectively, of the rim blank adjacent said weld zone;

each of said outside clamping members comprising a jaw having a substantially planar clamping surface and having a convex mounting surface disposed on the opposite side of said jaw from said clamping surface, a jaw holder for each of said jaws and having a concave seat engageable with the convex mounting surface of the jaw, the radius of the convex mounting surface of said jaw being slightly less than the radius of the concave seat of said holder thereby to permit said jaw to rock on said holder, and means for securing each jaw to its respective holder while permitting limited rocking of the jaw on the holder;

the inside member of each clamping assembly being substantially fixed against movement radially of the rim blank;

means mounting the outside member of each clamping assembly for movement radially of the rim blank between open and closed positions with respect to the inside member of the clamping assembly;

means supporting the clamping members of said first clamping assembly for lateral pivoting toward and away from the clamping members of said second clamping assembly;

means for moving the outside members of each clamping assembly to said closed positions after a rim blank has been placed between the inside and outside members;

means for thereafter pivoting the clamping members of said first assembly laterally toward the clamping members of said second assembly to press the longitudinal edges of the rim blank against one another; and means for passing an electric welding current through said clamping assemblies and the longitudinal edges of the rim blank to effect welding of the longitudinal edges.

17. A welding machine for welding the longitudinal seam of a wheel rim blank which has been rolled into a cylinder, the longitudinal edges of the blank forming the weld zone for the longitudinal seam, said machine comprising;

first and second clamping assemblies on laterally opposite sides of said weld zone and each including an inside clamping member and an outside clamping member for engaging the inner and outer surfaces, respectively, of the rim blank adjacent said weld zone;

the inside member of each clamping assembly being substantially fixed against movement radially of the rim blank;

each of said inside clamping members comprising an elongated welding electrode, an elongated bus bar for conducting electrical current to each electrode, notches spaced along each of said bus bars, and screws disposed within the notches of each bus bar and threaded into the respective electrode, said screws being clamped to the bus bar adjacent said notches and being removable from said notches upon unclamped from said bus bar;

means mounting the outside member of each clamping assembly for movement radially of the rim blank between open and closed positions with respect to the inside member of the clamping assembly;

means supporting the clamping members of said first clamping assembly for lateral pivoting toward and away from the clamping members of said second clamping assembly;

means for moving the outside members of each clamping assembly to said closed positions after a rim blank has been placed between the inside and outside members;

means for thereafter pivoting the clamping members of said first assembly laterally toward the clamping members of said second assembly to press the longitudinal edges of the rim blank against one another; and means for passing an electrode welding current through said clamping assemblies and the longitudinal edges of the rim blank to effect welding of the longitudinal edges.

* * * * *

UNITED STATES PATENT AND TRADEMARK OFFICE
CERTIFICATE OF CORRECTION

PATENT NO. : 4,562,326
DATED : December 31, 1985
INVENTOR(S) : Archie Tan, Vernon R. Fencl It is certified that error appears in the above-identified patent and that said Letters Patent is hereby corrected as shown below:

Col. 5, line 8, "84" should read as --85--;
Col. 7, line 58, "signl" should read --signal--;
Col. 8, line 57, "ides" should read --sides--;
Col. 10, line 16, "upon unclamped" should read
--upon being unclamped--.

Signed and Sealed this

Fifteenth Day of April 1986

[SEAL]

Attest:

DONALD J. QUIGG

Attesting Officer

Commissioner of Patents and Trademarks